United States Patent [19]

Simic-Glavaski

[11] Patent Number: 4,903,272
[45] Date of Patent: Feb. 20, 1990

[54] LASER

[75] Inventor: Branimir Simic-Glavaski, Cleveland Heights, Ohio

[73] Assignee: Partnership of M. G.Simic, P. D. Junger, D. M. Doyle, S. T. Jaros and B. Simic-Glavaski, Cleveland, Ohio

[21] Appl. No.: 266,216

[22] Filed: Oct. 28, 1988

Related U.S. Application Data

[63] Continuation of Ser. No. 773,411, Sep. 6, 1985, abandoned.

[51] Int. Cl.$^4$ .............................................. H01S 3/30
[52] U.S. Cl. ...................................................... 372/3
[58] Field of Search ............................ 372/3; 307/426

[56] References Cited

PUBLICATIONS

Moretti et al.; "Surface Enhanced Brillouin Scattering on Silver Films"; *The American Physical Society*, vol. 31, No. 6, Mar. 15, 1985; pp. 3361-3368.
"Birth of the Maser and Laser", NATURE, vol. 316, pp. 307-309, Jul. 25, 1985.
"High-Power Solid-State Lasers", NATURE, vol. 316, pp. 309-314, J. F. Holzrichter, Jul. 25, 1985.
"Laboratory Production of X-Ray Lasers", NATURE, vol. 316, pp. 314-319, M. H. Key, Jul. 25, 1985.
"Lasers, Monlinear Optics and Optical Computers", NATURE, vol. 316, pp. 319-324, S. D. Smith, Jul. 25, 1985.
"Laser Biology and Medicine", NATURE, vol. 316, pp. 325-330, V. S. Letokhov, Jul. 25, 1985.
LASERS, Bela A. Lengyel, Wiley-Interscience, New York, 1971, pp. v and 203-261.

*Primary Examiner*—William L. Sikes
*Assistant Examiner*—Robert E. Wise
*Attorney, Agent, or Firm*—Renner, Otto, Boisselle & Sklar

[57] ABSTRACT

Applicant has discovered a correlation between photography, the laser mechanism, and SERS. It appears that all three effects or phenomena of photography, laser and SERS, originate from a similar mechanism, namely the amplifying factor comes from Einstein coefficients and subsequent description of inverse population—these being the essential building blocks for the aforementioned three phenomena. Accordingly, one aspect of the invention is to utilize the principles of photography in connection with SERS. Another aspect is to utilize the principles of photography in connection with lasers. A still further object is to employ all three fields to achieve the lasing and laser effects described in greater detail below.

21 Claims, 3 Drawing Sheets

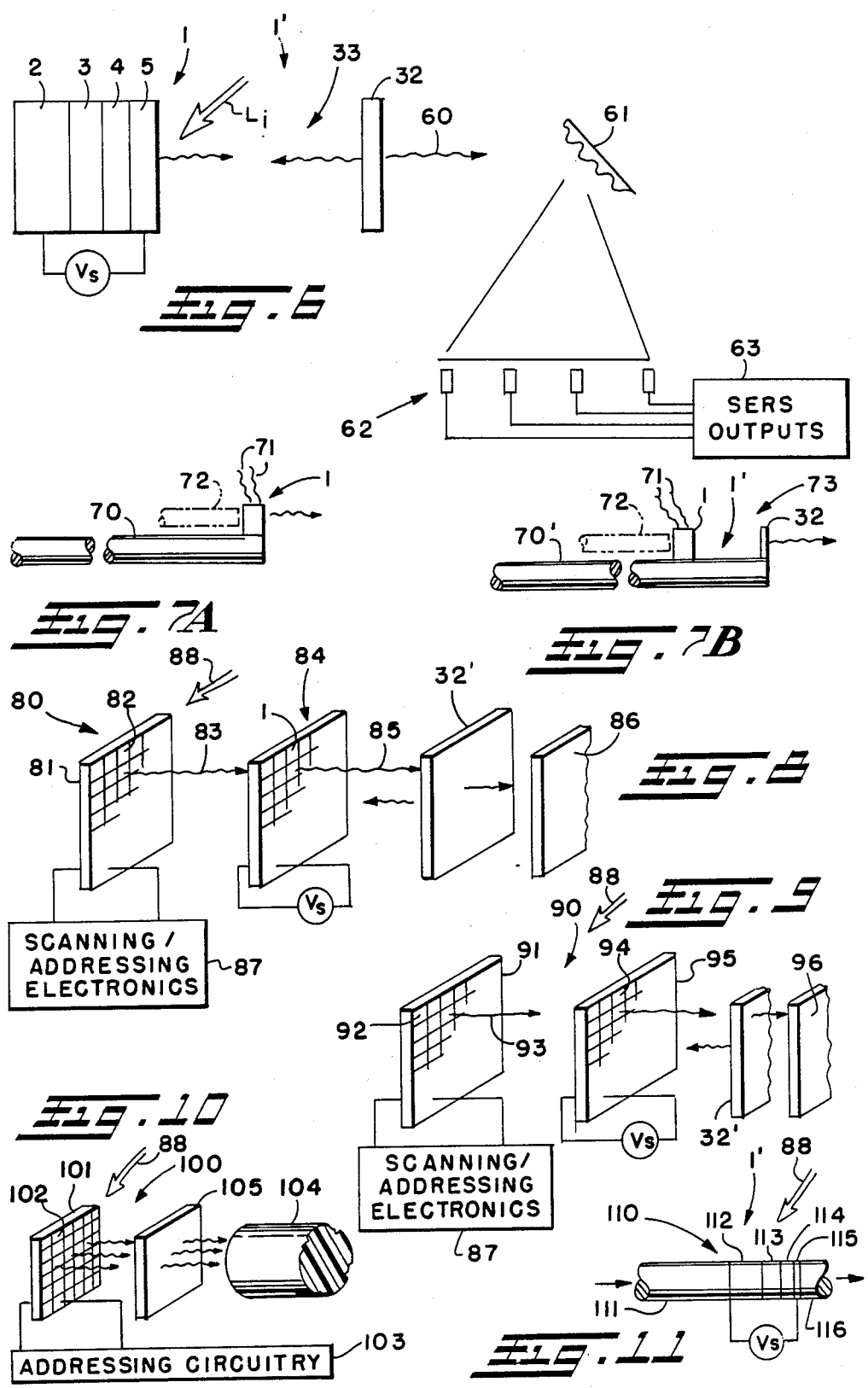

LASER

This is a continuation of co-pending application Ser. No. 773,411 filed on September 6, 1985, now abandoned.

TECHNICAL FIELD

The present invention relates generally, as indicated, to light amplification through stimulated emission of radiation and also to improvements and discoveries in the field of surface enhanced Raman scattering and devices therefor.

BACKGROUND

The phenomenon of surface enhanced Raman scattering has been used in the past for various purposes. One example of such use is in connection with a fast intramolecular transistor or switch device, as is disclosed in applicant's commonly assigned copending U.S. patent applications Ser. No. 535,672, filed September 26, 1983 and now abandoned, and Ser. No. 652,317, filed September 19, 1984 and now U.S. Pat. No. 4,855,243, the entire disclosures of which hereby are incorporated by reference. As is disclosed in such applications, light is scattered by a medium onto which incident light is directed; at least one detectable characteristic of the scattered light, such as wavelength or frequency, ordinarily will be a function of a characteristic, such as wavelength or frequency, of the incident radiation and/or of a characteristic of the scattering medium. Using Raman spectrometry techniques, the Raman spectrum of the scattered light can be detected to provide an output function.

Surface enhanced Raman scattering (hereinafter referred to as SERS) phenomena also have been used in the past for analytical purposes, e.g. to detect and to examine characteristics of various materials. SERS effects have been utilized and encountered in the past employing thin layers of one material coated on or supported on a support substrate. Exemplary substrates used in the past include silver, gold and copper. To achieve and/or to increase a detectable SERS effect, it was common practice to roughen the surface of such substrate prior to applying the coating layer thereon. The mechanism causing SERS effect was not well understood in the past, and, therefore, as applicant has discovered, such surface roughening did not necessarily contribute to an effective SERS result.

In prior SERS devices a semiconductor material layer would form on the surface of the substrate; however, the usual procedure for SERS was to remove or to minimize such layer. In the present invention, on the other hand, use is made of such layer as is described further below. Moreover, in the prior SERS devices the surface of the substrate was intentionally roughened, whereas in the present invention there is intentional polishing of such surface both because roughening is unnecessary and because the polished surface may serve as one reflector of an optical cavity, particularly an optically resonant cavity.

It is known in the field of light amplification by stimulated emission of radiation, lasers, that a lasing effect will occur in response to certain inverse population requirements. For example, in a particular material or medium when the population of electrons thereof in a relatively high energy level or energy state exceeds the population of electrons of such material that are a relatively lower energy level or energy state, inverse population requirements for lasing occur. Specifically, as electrons at the higher energy level drop to the relatively lower energy level, such electrons emit photons of light. The frequency of such photons is a function of the energy gap between the relatively high energy level and the relatively lower energy level mentioned.

Such inverse population may be created in a gas by passing a high density current through the gas to induce collisions between molecules or atoms thereof. The collisions result in pushing electrons to higher energy levels or states. When the electrons drop down to the relatively lower energy level, such as the so-called ground state therefor, they emit photons; this is stimulated emission of radiation. As was noted above, the frequency of the photon(s) is a function of the energy gap across which a given electron drops when going from the high energy state to the relatively lower energy state. In liquids such inverse population may be created using collisions induced by high electrical currents and/or by chemical reactions. Inverse population and lasing can be created in a solid by using impurities, such as chromium, in a perfect crystal, such as ruby. The chromium impurities in such example are brought to a higher energy state by applying high density photon flux thereto. The chromium atoms, after absorption of such light (photon flux) assume a relatively higher energy level than the ground state thereof, whereby inverse population conditions are met and subsequent lasing may occur as such chromium atoms drop back to the ground state. Such application of photon flux is known as optical pumping.

In semiconductor materials inverse population conditions can be created by energizing electrons from the valence band to a conduction band and the creation of electron hole pairs. Such energization can be achieved by passing high density currents through the semiconductor material, electron bombardment and/or optical pumping. The lasing effect occurs during the process of electron hole annihilation, i.e. the recombination of an electron and a hole.

In prior semiconductor lasers a semiconductor film was formed on an electrically conductive substrate. Lasing was caused by bombarding the semiconductor material with high energy electrons. However, in such devices the electrically conductive substrate primarily was used for thermal conduction purposes with respect to a cryostat; but the substrate did not contribute to the lasing function. On the other hand, in the present invention the silver substrate is used to contribute to the lasing function by supplying high energy electrons, but bombardment of the semiconductor material to cause lasing is carried out with laser light, not high energy electrons.

Prior semiconductor lasers have required substantial power input to achieve the desired lasing function. Such power requirements not only were expensive to generate and to supply but also resulted in substantial heat generation.

The effect of lasing can be harnessed in a laser by placing the lasing material in an optical cavity defined by reflectors or semi-reflectors at opposite ends of the cavity. The distance between such reflectors typically is a whole number multiple of the wavelength of the emitted light divided by 2. Usually one of the reflectors is a semi-transparent mirror that permits some of the radiation incident thereon to be transmitted therethrough as the laser radiation output of the laser itself.

One aspect of the present invention involves the field of photography. It is known in the field of photography that for each photon impinging on photographic film there are 10⁹ induced changes on the film, a significant amplifying effect.

BRIEF SUMMARY OF THE INVENTION

Applicant has discovered a correlation between photography, the laser mechanism, and SERS. It appears that all three effects or phenomena of photography, laser and SERS, originate from a similar mechanism, namely the amplifying factor comes from Einstein coefficients and subsequent description of inverse population—these being the essential building blocks for the aforementioned three phenomena.

Accordingly, one aspect of the invention is to utilize the principles of photography in connection with SERS. Another aspect is to utilize the principles of photography in connection with lasers. A still further object is to employ all three fields to achieve the lasing and laser effects described in greater detail below.

It also has been discovered that radiation emission during SERS is caused by the same mechanism that effects lasing in a material, especially with regard to semiconductor lasers. More specifically, according to one aspect of the invention a semiconductor material or any other material with adequate surface states, i.e. capable of having electrons at different energy levels, is deposited on a surface of a substrate, and a monolayer or several layers of adsorbed molecules is placed on the surface of such semiconductor or like material. Surface states are used to describe a specific state of electrons at the surface of the material. As used hereinafter "semiconductor material" includes both semiconductor material and material with similar characteristics in terms of being able to provide surface states with different energies. These materials may be, without limitation, conductors, semiconductors and dielectrics.

The substrate serves as a pool of electrons and may be any material capable of providing the semiconductor material with energy states that are equal to or higher than the energy states of the adsorbed molecules (monolayer or layers). Irradiation of such device, particularly of the adsorbed molecules and semiconductor material will result in the adsorbed molecules undergoing lasing effect to emit photons without having to roughen the surface of the substrate. Thus, SERS phenomenon is the same as lasing phenomenon. Indeed, according to an aspect of the invention nearly any material can be made to lase, i.e. to undergo lasing, when provided as a monolayer or several layers on or preferably adsorbed, a surface of a semiconductor supported by a substrate with the semiconductor and substrate providing the energy requirements previously noted while irradiation of the adsorbed molecules occurs. Thus, it will be appreciated that an aspect of the invention is the cooperation of such substrate, semiconductor material, and adsorbed molecules to emit radiation as a lasing phenomenon. Indeed, the invention can be used to cause lasing in many different materials.

Such lasing phenomenon may be harnessed further to create a laser having light amplification through multiple reflections. For example, contrary to the surface roughening preferred for SERS in the past, according to the present invention the surface of the substrate on which the semiconductor material is placed is optically reflective, for example being a highly polished flat surface, and a semi-transparent reflector is placed in spaced-apart relation to such surface a distance equal to a whole number multiple of the wavelength of the emitted radiation divided by 2 to form an optical cavity resonant at the noted wavelength or frequency of the emitted radiation.

Power requirements are much lower than for conventional semiconductor lasers. Cost of operation and cost to dissipate heat are reduced over prior semiconductor lasers.

According to the invention laser output radiation is tunable. Specifically, frequency modulation of output radiation is possible as a function of incident light and/or frequency characteristics of certain molecules, particularly the adsorbed molecules referred to herein. Moreover, intensity modulation of output radiation from a lasing material and/or a laser in which the same is used, is possible as a function of voltage applied across the molecules and semiconductor material on which they are adsorbed and/or the intensity of incident radiation.

The invention has applications in the medical field, the field of optical computers and/or communications systems, and in analytical fields, for example where SERS effects have been used in the past. Other applications of the invention include printer type devices, flat video screens, and other applications in which a small tunable laser may be used. The present invention can cause lasing at appropriate frequencies to be compatible with the fast switches disclosed in applicant's mentioned copending patent applications.

The foregoing and other aspects, objects, advantages and the like of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 6 is a schematic representation of a SERS system using the device of FIG. 1;

FIGS. 7A and 7B are schematic representations of the device of FIG. 1 used in conjunction with a fiber optics system for medical and like purposes;

FIG. 8 is a schematic representation of a printer using the device of FIG. 1;

FIG. 9 is a schematic illustration of a flat screen television display using the device of FIG. 1;

FIG. 10 is a schematic illustration of an optical communication system using the device of FIG. 1; and FIG. 11 is a schematic illustration of an optical booster for an optical transmission system using the device of FIG. 1 according to the invention.

DESCRIPTION OF THE PREFERRED EMBODIMENTS

Figure 1:
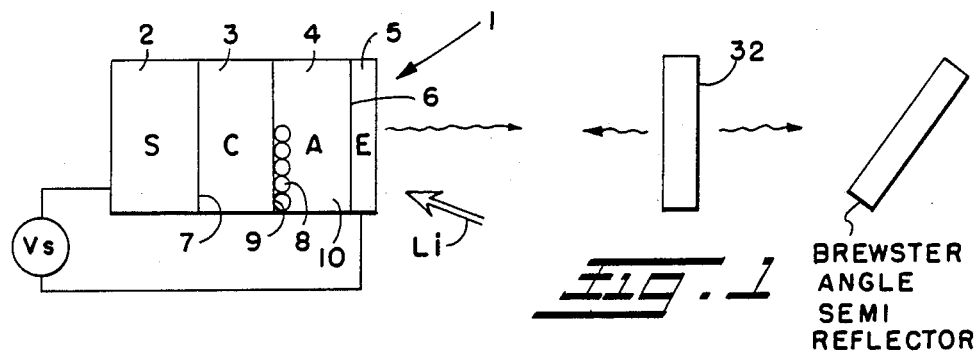
FIG. 1 is a schematic illustration of a lasing and laser device according to the present invention.

A device capable of lasing according to the present invention is generally indicated at 1 in FIG. 1. The fundamental parts of such device 1 include a substrate 2, a complex 3, and a material capable of undergoing lasing phenomenon 4, i.e. an active lasing material. A transparent electrolyte or electrode 5, such as a transparent liquid or solid, e.g. a thin metal film as tin oxide, is provided at the surface 6 of the material 4 remote from the substrate 2 to provide a means for applying potential across such material 4 and the complex 3, particularly to derive the high energy electrons from the substrate 2 required in operation of the device 1. However, under appropriate conditions of, for example, adequate power of incident illumination, it may be unnecessary to use such additional electrolyte 5 or to apply a separate electric potential across the lasing material 4.

The substrate 2 preferably is an electrically conductive material for providing a source or supply of high energy electrons. Exemplary materials are silver, gold, copper and aluminum, although other materials may be used, too. A most preferred substrate material is silver halide that facilitates using photographic principles or phenomena in the invention.

According to the invention, silver is a preferred substrate, and a silver halide is most preferred because of the photographic character of the latter and the linking of the invention to photographic phenomena. The substrate is treated to produce metallic silver with complex levels of $Ag^+/Ag$.

The complex 3 preferably is a semiconductor material. Exemplary semiconductor materials include tin oxide, silver oxide, silver sulfide, cadmium sulfide, galium arsenide or other dopable material in which the semiconducting band energy gap $E_g$ can be controlled. (The energy band gap $E_g$ is defined as the difference between the conduction band $Q_c$ and the valence band $Q_v$. The complex 3 may take the form of a semiconducting material layer or film formed on the surface 7 of the substrate. Such film may be an oxide formed on the surface 7. An example would be an $Ag^o/Ag^+$ complex. Such complex may be formed on the surface 7 of the substrate 2 by treating the substrate at such surface to produce an energy level of $Ag^+/Ag^o$.

$Ag^o/Ag^+$ form split energy levels. These may be formed as oxidation states or as reduction states. These states can be formed electrically or can be formed by dipping in photographic developers, for example.

The material 4 of the invention is a thin layer of molecules that will lase. The material 4 may be a monolayer, i.e. a layer of material one molecule in thickness, or several monolayers or molecules thick layers, and the primary requirement of such material 4 is that it will lase in response to the energization conditions described in further detail below. In a preferred embodiment of the invention such layer of material 3 is formed of molecules 8 adsorbed on the surface 9 of the complex 3. Examples of molecules 8 useful according to the invention include macrocyclic molecules, such as porphyrines, phthalocyanines, hemes, and chlorophyl; merocyanines (dyes); pyridine; cyanides; and ferrocyanide; however, others also may be used.

A thin film 10 of adsorbed molecules 8 is placed on the $Ag^+/Ag^o$ complex. The thin film is illuminated with an incident laser beam $L_i$ from a laser (not shown) of a frequency $w_i$; and one can observe excitation of the adsorbed molecules excited from their ground states E1 to their vibrational states E2. As long as the energy difference E2−E1 is greater than $E_g$, the necessary condition for inverse population and lasing (emitting of radiation) will occur. Using reflection principles to create an optically resonant cavity, such radiation can be further amplified to produce a laser radiation output, i.e. a coherent amplified radiation output or output signals.

The optical output resulting from such lasing will consist of several thin film laser lines. Such lines correspond to the vibrational frequencies of the adsorbed molecules in the thin film. Thus, lasing of the thin film appears frequency shifted from the incident laser frequency $w_i$ and can cover a wide frequency or wavelength range.

Nearly any material may be used for the substrate 2, according to the invention, as long as the substrate can serve as a pool of electrons, particularly to provide the complex 3 (e.g. semiconductor material 3) with energy states that are equal to or higher than the energy states of the adsorbed molecules layer 4, as is described in further detail below, to achieve the inverse population required to achieve the desired lasing output. Similarly, the material of which the complex 3 is composed may be any material capable of providing the functions below, i.e. of undergoing certain electron excitation required to provide the inverse population needs for lasing in the material 4. Moreover, the material of which the adsorbed monolayer or several monolayers of molecules 4 is composed also may be virtually any material which in response to the various energizations described herein will undergo the desired lasing.

Figure 2:
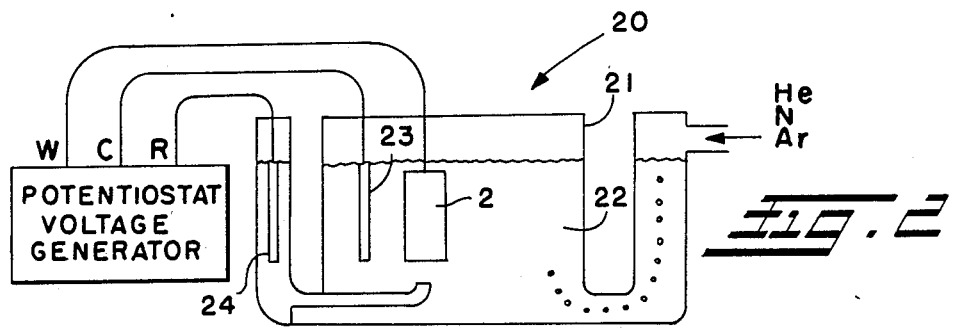
FIG. 2 is a schematic illustration of a system for making the device of FIG. 1.

Referring more particularly to FIG. 2, exemplary apparatus for forming the complex 3 on the surface of the substrate 2 is illustrated at 20. The apparatus 10 includes a container 21 within which is an electrolyte 22. A silver substrate 2' is placed in the electrolyte as are electrodes 23, 24. Such electrodes and the substrate are electrically connected to a potentiostat voltage generator, the purpose of which is to vary the voltage relationship between/among such electrodes to effect a desired redox state directly on the surface 7 and the $Ag^+/Ag^o$ complex couple states. The substrate 2 serves as a working electrode; and counter and reference electrode functions are provided, respectively, by the electrodes 23, 24. The counter electrode 23 may be, for example, a Saturated Calomel Electrode (SCE), and the reference electrode 24 may be, for example, platinum or gold wire.

The electrolyte may be, for example, water plus one of the following: $X_1MH_2SO_4$; $X_2MNaSO_4$; or $X_3MNaOH$; wherein $X_1$ may range from about 0.5 to about 0.0000005 mole; $X_2$ may be about 0.05 mole; and $X_3$ may range from about 0.1 to about 0.000001 mole. Moreover, the electrolyte preferably is purged with an inert gas, such as He, N, or Ar. Other gases may be used or included also.

In the apparatus 20 illustrated in FIG. 2 potential is applied between the reference and working electrodes. Such potential causes a current to flow between the working and reference electrodes. According to the principles of standard electrochemical cyclic voltammetry, potentials applied in the apparatus 20 are such as to correspond to the silver/silver halide dissolution and hydrogen evolution so that the desired complex 3 is formed on the substrate 2.

Figure 3:
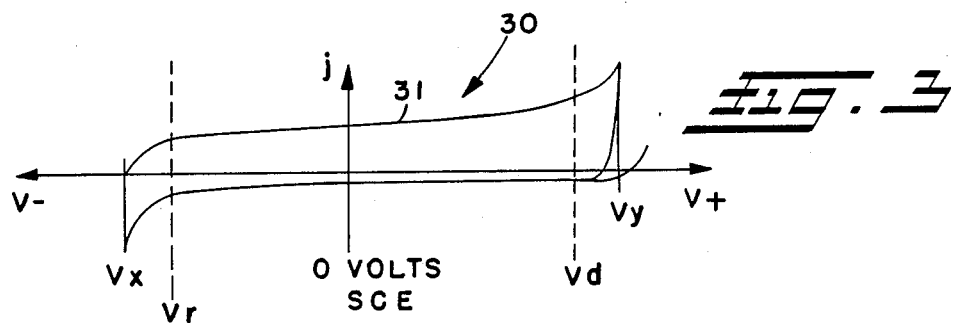
FIG. 3 is a graph of the electrical energies used in the system of FIG. 2.
Figures 4A, 4B:
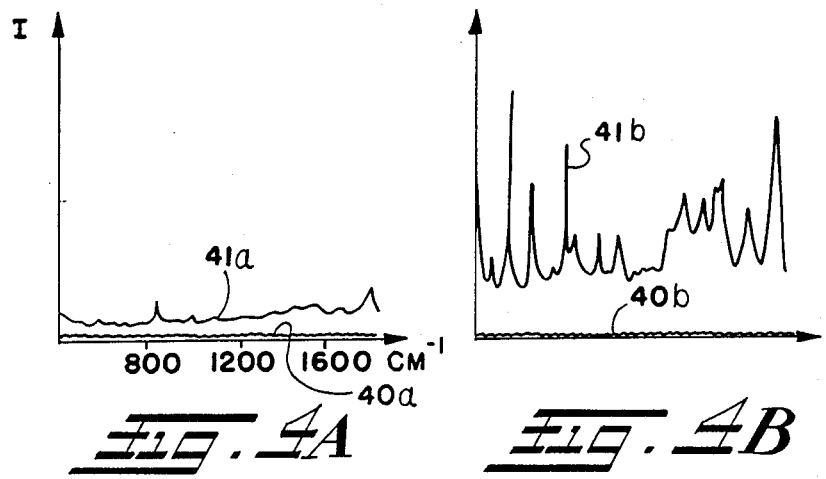
FIGS. 4A, 4B, 4C, 4D, and 4F are graphs of Raman scattering spectra.
Figure 4C:
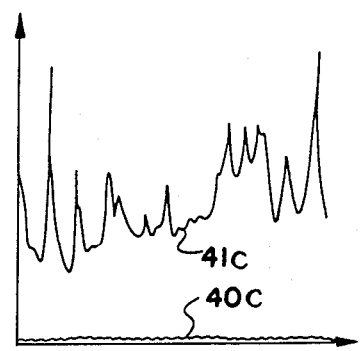
Figure 4D:
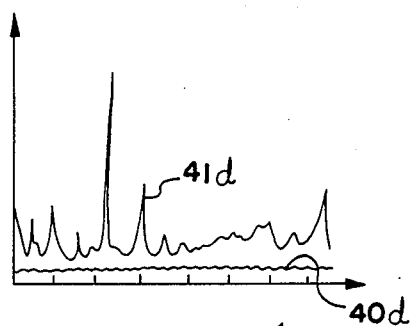
Figure 4E:
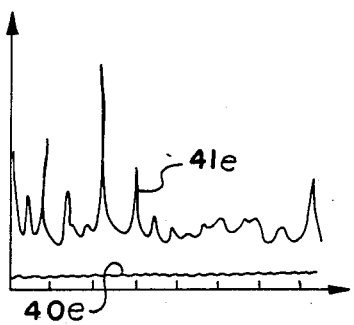
Figure 4F:
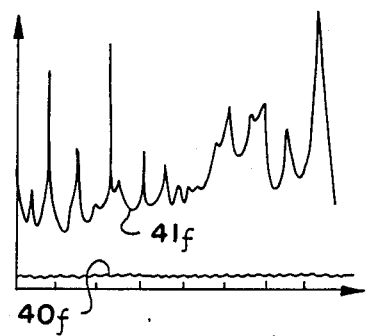

Briefly referring to FIG. 3, a graph 30 depicting the potentials and the cyclic voltammetry curve 31 employed during use of the apparatus 20 is shown. The horizontal axis represents potential relative to the SCE. The redox state in the substrate 2 is created at potential $V_r$ at the region where there is hydrogen evolution. The $Ag^+/Ag^o$ couple or complex is created at potential $V_d$ which is in the range of silver dissolution. The energy gap $E_g$ referred to above is represented by the difference between $V_r$ and $V_d$. To assure that the extremes of potential are reached during cyclic voltammetry use of the apparatus 20 to create the layers on the substrate 2, the voltages $V_x$ and $V_y$ are selected to exceed the magnitudes $V_r$ and $V_d$, respectively, as is seen in FIG. 3.

The monolayer or several monolayers of the molecules forming material 3 may be formed or applied to the surface 9 by various techniques. For example, one method would be electrochemical deposition by adding appropriate amounts of the material 3 to the electrolyte 22 and sweeping the potential of the apparatus between the $V_x$ and $V_y$ potential limits. Other methods for deposition of a thin film of such material 3 to a substrate 2, already previously treated to have redox states $Ag^{+-}/Ag^o$, include (a) applying a solution of the adsorbing molecules to the surface 9 and allowing the solvent of such solution to evaporate and (b) sputtering or spraying techniques.

Prior to formation of the layers 3, 4 and 5, the surface 7 of the substrate layer 2 is prepared by polishing the same to optical flatness and to have a mirror-like finish for optimal performance of the device 1. The layers 3, 4 and 5, in particular the surfaces thereof, should be parallel to the surface 7 with similar optical mirror-like appearances. Actually, the layers 3, 4 and 5 may be very thin, e.g. monolayers or several monolayers thick; and, therefore, such layers ordinarily would have a flatness and polish similar to those of the surface 7. Furthermore, if desired, the substrate layer 2 may be optically transparent to permit optical pumping of the device 1 through such material; for example, the layer 2 may be silver several angstroms thick or may be a silver halide, which is transparent.

A semi-transparent mirror 32 may be placed along the optical path from the device 1 a distance $n\lambda/2$ away from the surface 7 to create a resonant cavity for the light radiated by the layer 4, as is described further below. Such mirror 32 would perform a function similar to a typical semi-transparent mirror used in a conventional laser, i.e. amplification of the optical signal. However operation of the device 1 to effect a lasing function does not require such mirror or optical cavity. The lasing device 1 in combination with the mirror 32 is referred to below as the laser device 1' of the invention.

Figure 5:
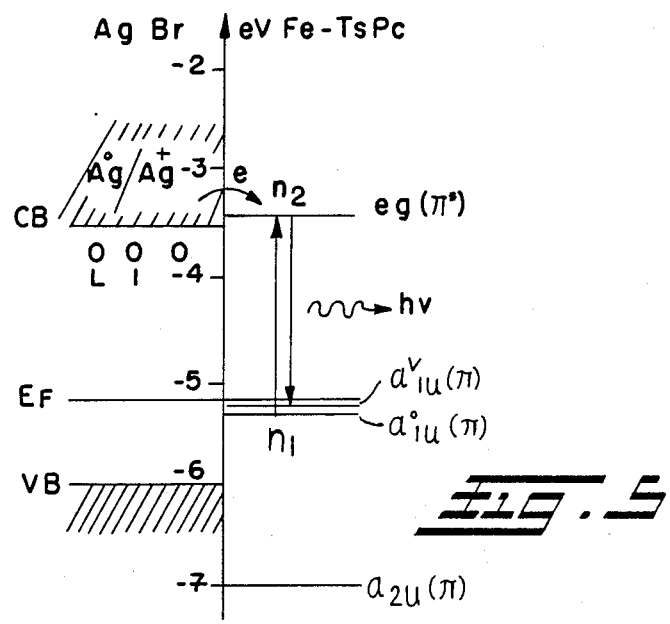
FIG. 5 is an energy diagram of the device of FIG. 1.

Summarizing operation of the device to effect a lasing function in or by the adsorbed layer 4, it is necessary to effect optical pumping to bring the adsorbed molecules of layer 4 from a so-called ground state or level to an excited state or level. At the same time an electron population in the substrate 2 is created such that the energy level in the substrate is at the same level as the excited state of the adsorbed molecules of layer 4; alternatively the energy levels of the substrate 2 may be even higher or greater than those of the adsorbed molecules. In either case, the excited electrons in the substrate help to provide the inverse population in the adsorbed molecules layer necessary for lasing. Specifically, as the electrons in the adsorbed molecules layer 4 drop back to the ground state lasing, i.e. light emission, occurs. The energy diagram of operation is shown in FIG. 5, which will be discussed in further detail below.

Operation of the device 1 to produce lasing in the material 4 starts with the device initially at a rest condition, i.e. no external inputs. In such condition of the device, all Fermi levels of the respective layers 2, 3, 4 and 5 are equal or about equal. Operation to cause lasing may be carried out by applying a potential gradient across the layers 3, 4 on the order of, for example, from about one to about three volts. Upon subsequent illumination (optical pumping) of the device 1 by a source, such as a laser for simplicity of monochromatic or in any event highly controlled wavelength and intensity of output, a condition of virtual states is created in the layer 4 which states are below the energy states of electrons in the conduction band of the layer 3. This phenomenon creates the conditions for inverse population.

The voltages mentioned above are exemplary. A voltage outside such range also may be used, depending on materials, illumination wavelength and intensity, and so on. Morever, a DC voltage may be used for constant output; whereas, an AC voltage may be used to facilitate a particular modulation function. Furthermore, as was described above, both the applied potential and the radiation input, i.e. laser input, may significantly contribute to the electronic and optical pumping to the population level in the conduction band of the layer 3. However, as was also mentioned above, although pumping both electrically and optically simultaneously is preferred, it would be possible to achieve the desired lasing output of the material in layer 4 by solely an optical pump or a voltage pump.

Application of the pumping voltage to the device 1 "pumps up" the electrons in the valence band $Q_v$ to populate the energy states of the semiconductor material 3 in the conduction band $Q_c$. The total number of electrons in the material 3 is not changed during such pumping. However, the number of electrons ordinarily in the conduction band $Q_c$ of the semiconductor layer 3 without pumping is $N_o^3$ (the superscript referring to layer 3); and due to such pumping the number of electrons in the conduction band $Q_c$ increases to $N_1^3$. The energy level of the $Q_v$ band is lower than the energy level of the $Q_c$ band. The electrons pumped up to the $Q_c$ band could come from other than the $Q_v$ band. By maintaining the potential applied from an external electrical source Vs and by the substrate 2 and electrode or electrolyte 5 across the semiconductor layer 3 and lasing material layer 4, the electrons that are raised to populate the $Q_c$ band in the semiconductor material 3 ordinarily cannot fall back to the lower energy level in the semiconductor layer 3.

The lasing material 4 ordinarily (i.e. without pumping) has a number $N_o^4$ (the superscript referring to layer 4) of electrons in the ground state. The mentioned optical pumping puts electrons in the lasing material layer 4 into the virtual states. The virtual states are at a higher energy level than the aforementioned valence band $Q_v$ energy level state. However, it is important for the energy level of the virtual state to be lower than the energy level of the conduction band of the semiconductor 3 to achieve the desired energy state population/inverse population requirements to achieve lasing operation of the invention. The number of electrons in the virtual states with such pumping is $N_v^4$. It is noted that in the ground states the electrons in the lasing material 4 may be at different energy levels or states, depending, for example, on the vibrational energy and/or vibrational frequency of respective electrons; and the same is true for the electrons in the virtual states. However, ordinarily the difference between respective energy levels in the ground state is relatively small, and, therefore, can be considered as a single energy level for purposes of the instant disclosure; and the same is true regarding the difference between respective energy levels in the virtual state.

The energy level of the electrons in the conduction band of the semiconductor material 3 is represented by $E_3$; and the energy level of the electrons in the virtual states in the lasing material 4 is represented by $E_V$. Since the energy level of $E_3$ is greater than the energy level $E_V$, there is a transition of electrons from the energy states $E_3$ to the energy level of $E_V$. This has been observed as a non-radiation emitting transition.

The total population (number) of electrons in the energy level $E_V$ thus increases and becomes much greater than the population of electrons $N_o^4$ at the energy level $E_o$, i.e. the ground state of the lasing material 4. Accordingly, inverse population conditions are met to permit lasing output operation by the material 4.

The difference in energy level between the ground state $E_o$ and the virtual state $E_V$ in the lasing material 4 is proportional to the frequency v of the incident pumping laser $L_i$. Specifically the energy difference is equal to hv, where h is Plank's constant and v is the frequency of the pumping laser $L_i$. The laser $L_i$ should result in the energy level of the virtual states of the lasing material 4 being lower than the energy level of the conduction band $Q_c$ of the semiconductor material. This condition may determine the frequency of the incident laser $L_i$ and/or the nature of the semiconductor material 3.

In operation of the device 1, some electrons in the virtual state in the lasing material 4 fall down to the vibrational levels or energies of the ground state; this is the final state of such electrons. During such transition, radiation is emitted. The frequency(ies) at which such radiation is emitted is related to the actual vibrational frequencies of the electrons undergoing such transitions.

The emitted light includes strongly enhanced Raman lines representative of characteristics of the lasing material 4. Such enhancement comes from the inverse population condition. Such enhanced Raman lines are useful for communications purposes. For example, a specific Raman line may be used to carry communications information rather than a wide laser spectrum of prior semiconductor lasers. The frequencies of the emitted light are, for example, the same as the incident laser frequency plus additional frequencies which correspond to the sum and difference of the incident laser frequency and vibrational frequencies v of the relaxing electrons.

EXAMPLE 1

Raman spectra were obtained using a He-Ne Spectra Physics laser model 124B. The laser produces 20 mW output power which resonantly excited adsorbed iron tetrasulfonated-phthalocyanine (Fe-TsPc) at 632.8 nm. The angle of the laser incidence was about 80 degrees relative to the surface normal, and the scattered light was fed into a Spex Triplemate monochromator supplied with a diode array detection system, Tracor Northern model 1700.

Silver bromide crystals in the form of plates of the type used for windows in infra-red spectroscopic measurements were mechanically polished to a mirror-like surface finish using emery paper and 0.05 aluminum oxide grit. The polishing procedure was similar to that by the inventor, as is described in *J. Am. Chem. Soc.* v. 107, 1985, although the procedure details are unnecessary as long as the polished finish is provided.

The reduction of the silver ions of such plates to metallic silver nuclei was performed by exposing the silver bromide plates to a commercially available Kodak D-76 reducing developer and to a developer prepared by the procedure described in Metz, H. J., *J. Phot. Sci.*, Vol. 20, pp. 111-119 (1972). Such latter procedure included using 10 gm. metol, 5 gm. potassium thiocyanate, 50 gm. potassium sulfite and water to make 1 liter. The silver bromide plates were exposed to the developer with three different times-$\frac{1}{2}$ minute, 1 minute, and 3 minutes. Then the plates were washed and dried. To such dried plates 3 $\mu l$ of $10^{-4}$ molar Fe-TsPc aqueous solution was applied to a surface area of three square centimeters. The solvent of such solution was permitted to evaporate leaving a monolayer of $10^{-10}M$ Fe-Pc per square centimeter.

EXAMPLE 2

Raman spectra were recorded from the adsorbed Fe-TsPc on non-developed silver bromide plates and developed silver bromide plates, which are described in Example 1. The spectra are depicted as respective curves in the graphs of FIGS. 4A through 4F. In each of such graphs Raman spectra for adsorbed Fe-TsPc on non-developed silver bromide are represented respectively by curves 40a through 40f. Indeed, it will be seen that there were virtually no Raman signals in such conditions even with the highest detector gain. On the other hand, a dramatic enhancement occurred in the Raman scattering from the samples of the adsorbed Fe-TsPc on developed silver bromide substrates, as is seen in the curves 41a through 41f. Such curves 41a–41c are for developed silver bromide using the developer according to Metz for $\frac{1}{2}$, 1, and 3 minutes respectively; and the curves 41d–41f are for developed silver bromide using the Kodak D-76 developer for $\frac{1}{2}$, 1, and 3 minutes respectively. Laser plasma lines * show also enhanced Rayleigh scattered light. Development of the AgBr and the recording of the spectra were performed at T$-20°$ C. Resolution 10 cm$^{-1}$. Relative spectral intensities I in counts/s are indicated for all three sets of the spectra. Data acquisition parameters were same in all recordings. Band assignments are in the *J. Am. Chem. Soc.* reference above.

Thus, applicant has discovered a dramatic enhancement in detectable Raman scattering phenomena according to the invention using substrates of the character described herein with appropriate interfaces, e.g. the complexes described above, between such substrates and adsorbed molecules of the character described, e.g. Fe-TsPc and so on, which are capable of lasing, as is described further herein. Moreover, applicant also has discovered that partial Raman spectra of the samples of developed silver bromide, limited by the grating window (600-1350 cm$^{-1}$) from the adsorbed Fe-TsPc on silver bromide are almost identical to those Raman spectra obtained from the adsorbed Fe-TsPc on polycrystalline silver (see *J. Am. Chem. Soc.* v. 107, above); and this discovery tends to indicate a physadsorption interaction. Moreover, applicant has discovered that spectral intensities according to the invention are proportional to the development of the silver from the silver bromide crystals.

Applicant also has discovered that small addition of gelatin will stabilize the Raman signals. Without such gelatin the Raman signals obtained in typical SERS and in the foregoing examples are not highly stable with respect to time. Typically, such Raman signals have a tendency to decay with time.

In FIG. 5 are depicted several energy levels of the electrons in semiconducting silver bromide which are of importance in photographic sensitivity—such energy levels are on the left side of the graph of FIG. 5; and FIG. 5 also depicts (on the right side thereof) the electron energy levels for the adsorbed Fe-TsPc described in the examples above. The scale of energy levels on the vertical axis of FIG. 5 is in electron volts (eV). The Fermi level $E_F$ for the ground state for both silver bromide and Fe-TsPc are about the same, approximately $-5$ eV. The valence band (VB) for the semiconducting silver bromide is below $-6$ eV and the conduction band (CB) is above about $-4.5$ eV.

More specifically, FIG. 5 is a diagram of the energy levels for the AgBr/Fe-TsPc interface. VB, CB and $E_F$ are top valence, bottom conductivity and the Fermi levels respectively. LI latent images. $a_{1u}$ (pi) and $a_{2u}°$ (pi) are occupied ground state levels for the Fe-TsPc and $e_g(pi^*)$ is the excited level. The emitted radiation hv originates from a transition from $e_g(pi^*)$ to a vibrational level $a_{1u}(pi)$. The energy gap for p-type semiconducting Fe-TsPc is $\Delta E_g = e_g(pi^*) - a_{1u}(pi) - 1.8$ eV.

Resonant laser excitation at 635 nm for Fe-TsPc induces electron transition from the filled energy state or quantum level or state $a_{1u}(pi)$ to the higher level $e_g(pi^*)$ level, which lies within the conduction band (CB) of the silver bromide containing $Ag^+/Ag^o$ complexes. The conduction band of the silver bromide containing $Ag^+/Ag^o$ complexes may be in resonance or higher in energy or excitation than the $e_g(pi^*)$ level of the adsorbed molecules (as the latter are optically pumped). If the energy levels or quantum states of the electrons in the conduction band of the silver bromide complexes is the same as that of the energized electrons in the adsorbed Fe-TsPc molecules, then there is resonant transfer between the complexes and the adsorbed molecules; otherwise, the electrons of the complexes drop down to the virtual level $e_g(pi^*)$ of the adsorbed molecules -such dropping in energy level being observed not to be a light emitting phenomenon. Whether the electron energization in the layer 3 is equal to or greater than that of the adsorbed molecules, such condition will result in fulfillment of the inverse population requirement for achieving lasing in the adsorbed layer 4.

When the excited electrons in the virtual states in the lasing material or adsorbed molecules in layer 4 drop down from the energy state $e_g(pi^*)$ to one of the ground energy states shown in FIG. 5, there is light emission at the wavelength hv, as also is depicted in FIG. 5.

In view of the foregoing, it will be appreciated that the present invention may be used to increase appreciably the magnitudes of the outputs in SERS processes. For example, referring to FIG. 6, the device 1 of the invention is used with a semi-transparent mirror 32 to create an optical resonant cavity 33 and amplification of the optical signal. Upon application of a suitable potential by the voltage source Vs and optical pumping of the adsorbed molecules 4 by incident laser $L_i$, the material 4 will undergo lasing, and coherent monochromatic radiation, e.g. visible light, or radiation in another wavelength, such as X-ray, of the laser type will be emitted, as at 60. The laser output 60 is directed to a grating monochromator 61, which separates the light incident thereon into one or more respective Raman lines, each of which has a characteristic intensity depending on the characteristics of the incident laser illumination $L_i$, the voltage Vs, and/or the molecules making up the layer 4. Plural photosensors 62, e.g. diodes, may be used to detect the respective Raman lines, as is conventional, and appropriate automatic, recording, or other use of information derived from such Raman may be achieved by a conventional SERS output device 63, such as a recorder or computer.

It will be appreciated that the intensity and definition of such Raman lines will be substantially enhanced over what otherwise would be the case without the light amplification accomplished using the device 1' of the present invention— e.g. the stimulated/amplified emission using the substrate 2, complex 3 and adsorbed molecules 4 in the device and the further amplification and enhancement using the polished surface 7 of the device 1 together with the semi-transparent reflector 32. Moreover, SERS phenomena using multilevel signals with distinguishable outputs and output levels can now be utilized with appreciable accuracy when employing the present invention. For example, as is described in applicant's above-mentioned copending applications, multilevel outputs can be achieved in SERS systems by observing the magnitude of a given Raman line. Due to the enhancement of outputs using the laser function with semi-transparent mirror 32 in conjunction with device 1, accurate distinguishing of such levels of independent Raman lines is substantially facilitated.

The device 1, 1' according to the invention is tunable in that frequency modulation of output light is possible as a function of incident radiation $L_i$ and/or frequency characteristics of the molecules in the layer 4. More specifically, since the energy level $e_g(pi^*)$ is a virtual state, it can be any state depending on the frequency of the incident illumination. This, therefore, may result in operation in very wide frequency ranges of the electromagnetic spectrum. The output radiation frequency v is a function of the adsorbed molecules. It will be appreciated, though, that the wavelength or frequency of the incident light $L_i$ is not material to operation of the invention. Specifically, the device 1 will lase, and the reflector 32 will allow laser operation, regardless of whether the incident radiation is coherent, monochromatic, incoherent, multicolor, etc. Indeed, light from a flashlight would work as long as intensity is adequate and the applied voltage Vs is appropriate, but the output from the device 1 would be a mixture of frequencies. However, use of a laser $L_i$ as the incident light with monochromatic and coherent properties will facilitate accurate identification of the characteristics of the output radiation from the device 1, 1'. As an example, if the input radiation is from a laser, which is monochromatic and coherent, the output radiation will be at one or specific relatively easily distinguishable frequencies.

According to the invention intensity modulation of the output radiation is possible. Specifically, as the magnitude of the applied potential Vs, applied via the substrate 2 and electrolyte or electrode 5, is varied, the intensity of the output radiation 60 (FIG. 6, for example) will vary. Indeed, it will be appreciated that by selecting an appropriate voltage Vs, it would be possible to reduce the amount of amplification required for the signals produced by the detectors 62 (FIG. 6) or possibly even to eliminate the need for any such amplification.

The present invention has uses in the medical field. For example, a device 1 may be employed as a source of illumination, as is depicted schematically in FIG. 7A. By placing such a device 1 of small size at or near the end of an optical fiber or filament 70, it may be possible to provide local illumination for that which is to be observed through such optical filament. Electrical energization for the device 1 may be provided by the leads 71, and a source of incident illumination for the device 1 may be provided, for example, through the filament 70, e.g. using appropriate reflectors to direct such incident illumination thereto or by a separate optical filament shown in phantom at 72. As is shown in FIG. 7B, a semi-transparent reflector 32 may be used to create a resonant optical cavity for the device 1, 1' in order to derive laser output for irradiating or illuminating that to which such radiation is directed. In this case it may be possible to use the invention selectively to provide a burning or destroying function, depending, for example, on the intensity and/or frequency of the output from the laser device 73 shown. For such destructive purpose, the present invention is particularly useful because of the ability to achieve accurate frequency tuning thereby to kill specified cells without harming other cells, for example. It will be appreciated that the optical fibers and devices 1 illustrated in FIGS. 7A and 7B may be used internally of the body, e.g. being inserted as a catheter, via surgery, etc.

The invention may be used as a fast printer 80 (FIG. 8) without any moving parts. Such device 80 would include the fast switch 81 of applicant's above application with many addressable pixels 82. Each pixel could be addressed to cause output radiation 83 to be directed to a respective one of the devices 1 arranged in an array 84 thereof for optical pumping; the devices 1 in turn would be electrically energized as above using a voltage source Vs and would provide a radiation input 85 to printing paper 86, such as thermal paper or photosensitive material. Appropriate scanning/addressing electronics 87 may be provided to address the respective switches 82 to provide appropriate electrical inputs thereto of the type disclosed in applicant's copending application(s) mentioned above. An optical pumping of such switches 82 also may be provided, as shown at 88, e.g. by a laser. Although the printer 80 may operate satisfactorily without any semi-transparent mirror 32' for amplification of the optical signal, it will be appreciated that such amplification would intensify the output and improve the printing function, resolution, and overall quality. The mirror 32' may be plural mirrors 32, one for each device 1 in the array 84 or may be one or plural mirrors that provide the amplification function for several (or all) of the devices 1 in the array 84. It also is possible to eliminate from the printer 80 the array 81 of fast switches 82 and instead to optically pump the devices 1 in array 84 while electrically selectively addressing and energizing the individual devices 1 in the array 84 using circuitry 87 to apply potential $V_s$ to such devices 1, although such embodiment is less preferred than the one illustrated in FIG. 8.

Another exemplary use of the device 1, as is schematically illustrated in FIG. 9, would be as a flat video type screen 90 for television and the like. Such screen would be comprised of an array 91 of a plurality of the fast switches 92 coupled to provide illumination 93 to respective pixels 94 formed of the device 1 arranged in a corresponding viewable array 95. As each pixel 92 is electrically (or optically) addressed it would produce appropriate output radiation (or electrical output) to induce the desired light output by the respective pixel device 1 in the array/screen 95. Depending on use, the output of the array/screen 95 may be in the form of devices 1 without semi-transparent reflectors 32 or may include respective semi-transparent reflectors to achieve the amplification described above with a laser type output from each pixel. It will be appreciated that a single semi-transparent reflector 32' may be used as the reflector for a plurality of the pixels of such an array/screen 95. The output from the system 90 could be viewed directly or such output could be directed to a photosensitive or other device, e.g. screen 96, on which a viewable image would be created by illumination from the devices 1, 1' in the system 90. As was described above with respect to the printer of FIG. 8, the fast switch array may be eliminated and the electrical scanning circuitry 87 and optical pumping source 88 coupled directly to the array 95 for operation without such fast switches; however, this embodiment is less preferred than that illustrated in FIG. 9.

Moreover, in both the printer and display embodiments of FIGS. 8 and 9 true memory mapping is possible. Appropriate scanning/addressing electronics 87 would be provided to address the respective switches 82 to provide appropriate electrical inputs thereto of the type disclosed in applicant's copending application(s) mentioned above. The arrays 81, 83, 91, and 95 may be formed of extremely small pixels consistent with the present invention. For example, each pixel may be on the order of from about 5 microns by 5 microns in area; therefore, approximately $4 \times 10^{11}$ pixels may be placed in a one square meter area. An advantage of the optical output of the arrays 84 and 95 is the ability to make a permanent record of the output at any given time simply by taking a photograph thereof.

Another use of the present invention is in the field of optical computers and communications systems. For example, the device 1 may be used as an amplifier for processing signals. As another example, the device 1 may be used to provide frequency and/or intensity modulation of optical signals for use in optical computing and/or communication devices. One example of such a communications system 100 is represented schematically in FIG. 10. The system 100 includes a grid or array 101 of a plurality of pixels 102, each of which is like the device 1 of FIG. 1. Each pixel 102 may be separately addressed by the circuitry 103 to produce an output that may be directed into and along an optical fiber 104 for transmission and subsequent use. Each light output from the device 1 may be spatially separated, frequency separated or time/phase separated from the others in order to permit the optical fiber to carry plural signals therealong. Preferably the devices 1 are of the laser type and, therefore, have respective semitransparent mirrors or one (or several) shared semitransparent mirror(s) 105 to obtain an amplification of the optical signal to provide a laser type output from each.

Turning to FIG. 11, the device 1 of the present invention may be used as an optical booster 110 in a fiber optical transmission system and the like. Specifically, a device 1' or a plurality thereof are positioned to receive as an input optical signals from the input fiber optic cable 111. Such optical signals provide an optical pump input to the booster 110, which includes a substrate layer 112, complex layer 113, lasing material 114, and electrode 115, corresponding to parts 2, 3, 4 and 5 described above. Voltage is supplied the electrodes 112, 115 by source $V_s$. If necessary, a further optical pumping may be effected by the external laser source 88 illustrated. The output radiation from the lasing material 114 is directed into fiber optic cable 116 as a boosted and/or modulated, e.g. according to the optical pumping 88 or electrical input $V_s$m signal(s). Preferably reflective or partly reflective surfaces or materials are provided at the interface of layers 112, 113 and at the interface of electrode 115 with the fiber optics 116 to obtain the desired light amplification function to intensity, etc. (as a laser can do) the optical signal directed into the fiber optic cable 116.

Furthermore, if desired, applicant's fast switch device disclosed in the above-mentioned copending applications could be used serially with the device 1' in the booster 110 in a manner similar to that shown in the printer 80 and display 90 of FIGS. 8 and 9.

The embodiments of the invention in which an exclusive property or privilege is claimed are, as follows:

1. A device capable of lasing in an optically resonant cavity, comprising an electrically conductive substrate, complex means for supporting plural energy states of electrons thereof, and lasing material means for lasing in response to at least one of optical pumping and electrical pumping to produce an electromagnetic radiation output, said complex means comprising a material having ground states able to provide transfer of electrons to an excited state which is higher than the excited state of said lasing material means and being operable to transfer such excited electrons to the excited state of said lasing material means therefor contributing to inverse population conditions in said lasing material means to effect lasing by said lasing material means.

2. The device of claim 1, said electrically conductive substrate comprising silver.

3. The device of claim 1, said electrically conductive substrate comprising a silver halide.

4. The device of claim 1, said complex means comprising a material selected from the group comprising a conductor, semiconductor and dielectric.

5. The device of claim 1, said lasing material means comprising a material selected from the group comprising macrocyclic molecules; merocyanines (dyes); pyradine; cyanides; and ferrocyanide.

6. The device of claim 1, said lasing material means comprising a material selected from the group comprising porphyrines, phthalocyanines, hemes, and chlorophyl.

7. The device of claim 1, said substrate having a polished reflective surface on which said complex is supported.

8. The device of claim 7, said lasing material means comprising a at least one of a monolayer adsorbed on said surface and plural monolayers adsorbed on said surface.

9. The device of claim 8, further comprising a semi-transparent reflector positioned from said surface to form an optical resonant cavity to effect amplification of the optical signal emitted by said lasing material means.

10. The device of claim 1, said material comprising at least one of a monolayer of molecules adsorbed on the surface of said complex means and plural monolayers of molecules adsorbed on the surface of said complex means.

11. The device of claim 1, further comprising electrical input means to effect electrical energization or pumping.

12. The device of claim 1, further comprising optical input means to effect optical pumping of the device.

13. The device of claim 1, further comprising means for providing both optical and electrical pumping to said lasing material means.

14. The device of claim 1, wherein said complex means is on a surface of said electrically conductive substrate, and said lasing material means is adsorbed on a surface of said complex means.

15. The device of claim 1, wherein said complex means comprises an oxide.

16. The device of claim 1, wherein said complex means comprises $Ag^o/Ag^+$.

17. A laser comprising an electrically conductive substrate, complex means for supporting plural surface energy states of electrons thereof, lasing means for of lasing in response to at least one of optical pumping and electrical pumping to produce an electromagnetic radiation output, pumping means for delivering energy for pumping to cause lasing, means for creating a resonant cavity, said complex means and said lasing material means being in said resonant cavity, and means for abstracting energy from said resonant cavity, and wherein said complex means comprises a material having ground states able to provide transfer of electrons to an excited state which is higher than the excited state of said lasing material means and is operable to transfer such excited electrons to the excited state of said lasing material means therefor contributing to inverse population conditions in the said lasing material means to effect lasing by said lasing material means.

18. The laser of claim 17, said pumping means comprising means for providing both optical and electrical pumping to said lasing material means.

19. The laser of claim 17, wherein said complex means is on a surface of said electrically conductive substrate, and said lasing material means is adsorbed on a surface of said complex means.

20. The laser of claim 17, wherein said complex means comprises an oxide.

21. The laser of claim 17, wherein said complex means comprises $Ag^o/Ag^+$.

* * * * *